June 22, 1926.
P. BRENNER
SHEARS
Filed Nov. 10, 1925
1,590,075
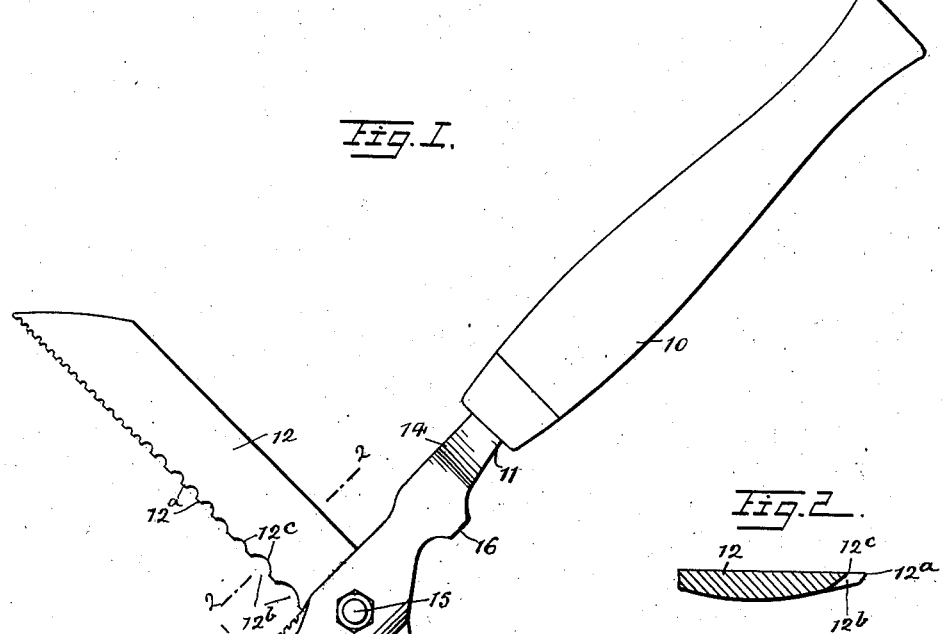
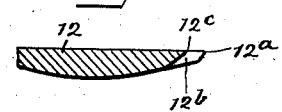
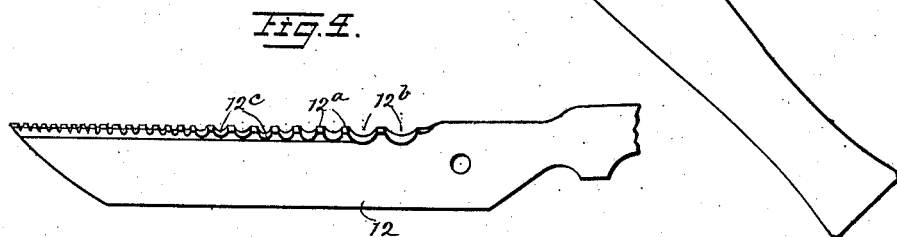
WITNESSES
H. T. Walker
Franklin J. Foster
INVENTOR
Peter Brenner
BY Munn & Co
ATTORNEYS Patented June 22, 1926.

1,590,075

UNITED STATES PATENT OFFICE.

PETER BRENNER, OF MONTICELLO, NEW YORK.

SHEARS.

Application filed November 10, 1925. Serial No. 68,124.

The shears of the present invention are capable of a wide field of utility, but primarily designed for use in trimming hedges and other shrubbery.

An object of the invention is to provide a pair of hedge shears with which relatively thick stems may be readily severed by clean cut without mutilating or chewing the severed ends.

A further object of the invention is to provide a pair of shears of simple, practical construction which will be rugged and durable in use, which are equipped with a pair of cutting blades facilitating the clean and rapid cutting of relatively heavy branches, without interfering with the efficiency of the shears for lighter work.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein Fig. 1 is a plan view of a pair of shears embodying the invention.

Fig. 2 is an enlarged transverse sectional view on the line 2—2 of Fig. 1.

Fig. 3 is a similar view on the line 3—3 of Fig. 1.

Fig. 4 is a plan view of the reverse side of the cutting blade 12.

In the drawings I have used the reference characters 10, 10 to designate the handles of the shears connected to the shanks 11 of cutting blades 12 and 13. The shanks 11 are offset as at 14 to dispose the cutting blades without the plane of the handles, and the blades are pivoted together upon a stud 15 in the usual manner.

Inwardly projecting abutments 16 on the shanks are engageable with each other to limit the inward swinging movement of the handles 10, so that the fingers of an operator will not be pinched between the handles.

The present invention is primarily concerned with the construction of the two cutting blades of the shears. It has been discovered that the ordinary straight edged shear is highly unsatisfactory for cutting heavy twigs and branches when used in trimming hedges or other heavy shrubbery. In accordance with the present invention the cutting edge $13^a$ of the blade 13 is notched or serrated at $13^b$ throughout its length, providing a series of teeth $13^c$ which will bite into a heavy branch or twig and force the same firmly into engagement with the other cutting blade 12.

The blade 12 on the other hand, is formed in its clutting edge $12^a$ with a number of arcuate depressions $12^b$, each defining their own curved cutting edges $12^c$. It will be noted that the notches $12^b$ become progressively smaller from the inner to the outer end of the cutting edge. The advantage of progressively reducing the size of the arcuate notches in blade 12 will be apparent, since by virtue of the arrangement shown, the largest of these notches is provided nearest the fulcrum 15, so that a maximum leverage is obtained at this point.

In using the shears, the notches $12^b$ will partially embrace a heavy twig or branch to be cut, and the teeth $13^c$ biting into the branch will force it firmly into the notch $12^b$ where it will be severed by a substantially uniform cutting action.

With the ordinary straight edged blades, the blades not only slip on heavy branches, but are further inefficient because they attempt to cut through two spaced points on the periphery of the branch. It will be seen that the arcuate notches $12^b$ and their cutting edges $12^a$ embrace the branch and start cutting throughout a substantial portion of the circumference thereof.

It is of course to be understood that the shears might be used in trimming lawns or for any other similar purpose, and that various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims.

I claim:

1. Shears of the class described including pivoted blades, one of said blades having a finely toothed edge, and the other of said blades having a series of arcuate notches in its cutting edge adapted to sever a branch held by the teeth.

2. A pair of shears including pivoted cutting blades, one of said blades including means to bite and grip a branch to be cut, and the other of said blades including a series of arcuate cutting surfaces adapted to sever a branch engaged by the other blade.

PETER BRENNER.